United States Patent
Honsowetz et al.

(10) Patent No.: US 9,971,801 B2
(45) Date of Patent: May 15, 2018

(54) GRID CELL DATA REQUESTS

(71) Applicant: Interject Data Systems, Inc., Vancouver, WA (US)

(72) Inventors: Jeffrey Dean Honsowetz, Vancouver, WA (US); Evgen Lyubar, Vancouver, WA (US)

(73) Assignee: Interject Data Systems, Inc., Vancouver, WA (US)

( * ) Notice: Subject to any disclaimer, the term of this patent is extended or adjusted under 35 U.S.C. 154(b) by 493 days.

(21) Appl. No.: 14/643,874

(22) Filed: Mar. 10, 2015

(65) Prior Publication Data
US 2015/0278328 A1 Oct. 1, 2015

Related U.S. Application Data

(60) Provisional application No. 61/970,708, filed on Mar. 26, 2014.

(51) Int. Cl.
*G06F 7/00* (2006.01)
*G06F 17/30* (2006.01)

(52) U.S. Cl.
CPC .. *G06F 17/30339* (2013.01); *G06F 17/30598* (2013.01)

(58) Field of Classification Search
CPC ............... G06F 17/30339; G06F 17/30598
USPC ........................................................ 707/739
See application file for complete search history.

(56) References Cited

U.S. PATENT DOCUMENTS

| 7,051,038 | B1* | 5/2006 | Yeh ................... | G06F 17/30575 707/603 |
|---|---|---|---|---|
| 7,089,530 | B1* | 8/2006 | Dardinski ............. | G05B 15/02 700/83 |
| 7,761,591 | B2* | 7/2010 | Graham ................ | G06Q 40/02 709/204 |
| 8,838,575 | B2* | 9/2014 | Schwarz ........... | G06F 17/30309 707/711 |
| 2003/0061212 | A1* | 3/2003 | Smith .................... | G06Q 10/06 707/999.006 |
| 2003/0197744 | A1* | 10/2003 | Irvine .................... | G06F 3/038 715/856 |
| 2004/0243593 | A1* | 12/2004 | Stolte ................ | G06F 17/30339 707/999.1 |
| 2006/0010426 | A1* | 1/2006 | Lewis ................ | G06F 11/3684 717/124 |
| 2006/0085444 | A1* | 4/2006 | Sarawgi ............. | G06F 17/3046 707/999.1 |
| 2011/0288692 | A1* | 11/2011 | Scott ...................... | G06F 21/55 700/297 |

(Continued)

*Primary Examiner* — Usmaan Saeed
*Assistant Examiner* — Brian E. Weinrich
(74) *Attorney, Agent, or Firm* — McCoy Russell LLP

(57) ABSTRACT

Systems and methods are provided to improve the efficiency and productivity of using a remote server to display data in a grid. In one embodiment, a method for managing data in a grid displayed on a client device comprises, responsive to receiving a data request from the client device, returning to a cell or cells in the grid a cached calculation result corresponding to the data request if the data request is stored in a cache, and otherwise processing a calculation corresponding to the data request. In this way, a relational database may efficiently handle numerous data requests that would normally be handled by an online analytic processing server.

18 Claims, 8 Drawing Sheets

(56) References Cited

U.S. PATENT DOCUMENTS

| | | | |
|---|---|---|---|
| 2012/0109790 A1* | 5/2012 | Bhatia | G06Q 40/12 705/30 |
| 2012/0330954 A1* | 12/2012 | Sivasubramanian | G06F 9/5061 707/737 |
| 2014/0188928 A1* | 7/2014 | Singh | G06F 17/30289 707/769 |

* cited by examiner

| Ref Key 503 | Source 505 | Year 507 | Period 509 | Etc. 510 | Change 511 | Value 513 | Delta 515 |
|---|---|---|---|---|---|---|---|
| 154863 | Actual | 2014 | June | . | 1 | 150.00 | 150.00 |
| 154863 | Actual | 2014 | June | . | 2 | 250.00 | 100.00 |

| Ref Key 603 | Source 605 | Year 607 | Period 609 | Etc. 610 | Last Change 611 | Value 613 |
|---|---|---|---|---|---|---|
| 154863 | Actual | 2014 | June | . | 2 | 250.00 |

GRID CELL DATA REQUESTS

CROSS REFERENCE TO RELATED APPLICATION

The present application claims the benefit of and priority to U.S. Provisional Patent Application No. 61/970,708, filed Mar. 26, 2014 and titled "GRID CELL DATA REQUESTS," the content of which is incorporated herein by reference for all purposes.

BACKGROUND AND SUMMARY

Spreadsheet applications or other applications that present data in a grid format may be used to access and format data, e.g., financial data, from data sources for use in generating various reports, e.g., financial reports. In some approaches, a notation, e.g., a formula, may be included in a grid or spreadsheet cell in order to retrieve data from a data source to be displayed in that cell. Further, in some approaches, data from a data source may be imported into a proprietary database so that the spreadsheet application can access the data via a spreadsheet add-in or via specialized formulas.

However, the inventors herein have recognized issues with such approaches that use each notation as an individual data request for a cell. For a medium or large report, thousands of notations may be needed to create a full report, and if there are multiple reporting entities, the number of notations is further multiplied by each entity and different view. This approach can result in reports calculating very slowly, the underlying computer systems supporting the reports can be encumbered by excessive processing requirements, and the user's computer session may be unusable during long calculations.

Furthermore, since there are so many data requests being processed for a single report, the underlying systems may not have the capacity to provide reporting features for many concurrent users or have features that require additional resources, such as detailed security rules, advanced financial segment grouping syntaxes, or routine check and balance procedures to verify the accuracy of the data.

Further still, approaches which import data from a data source into a proprietary database and replace the entire data period imported may increase delays in accessing and updating data, reduce accessibility to data, and increase resource drain.

As another example, existing approaches to using requests per cell may not efficiently summarize the thousands of notations and send them to centralized servers for processing. Instead, the current user's session may have to handle a significant processing load for the calculations and re-perform the calculations at the next calculation. This not only encumbers the user session but for a large company could be needlessly drawing resources from a virtual server environment. Furthermore, without proper methods to use centralized servers for calculation processing, there is limited scalability and features that can be leveraged through the internet.

In order to address the issues outline above, systems and methods are provided to improve the efficiency and productivity of using a remote server to display data in a grid. In one embodiment, a method for managing data in a grid displayed on a client device comprises, responsive to receiving a data request from the client device, returning to a cell or cells in the grid a cached calculation corresponding to the data request if the data request is stored in a cache, and otherwise processing a calculation corresponding to the data request. In this way, a relational database may efficiently handle numerous data requests that would normally be handled by an online analytic processing server.

In another embodiment, a method for managing data in a grid on a client device comprises, responsive to receiving an imported data value from a remote data source, replacing a previously imported data value with the imported data value responsive to a non-zero difference between the imported data value and the previously imported data value. In this way, data processing and synchronization using a relational database is made more efficient and change visibility for client reporting is enabled.

As another embodiment, a system for managing data in a grid comprises: one or more data sources configured to store raw data; a client device configured with a grid application; a grid server configured with a relational database and adapted to service requests from the client device, the grid server configured to store data processed from the raw data in the relational database, the grid server further configured with a cache to store calculations; and an import manager configured to import changes in the raw data from the data storage into the grid server and to store historical values of the raw data. In this way, advanced processing is available to a relational database user while minimally encumbering a user session.

BRIEF DESCRIPTION OF THE DRAWINGS

The present invention will be better understood from reading the following description of non-limiting embodiments, with reference to the attached drawings, wherein below:

FIG. 5 shows an example grid illustrating imported changes.

FIG. 6 shows an example grid illustrating stored changes.

DETAILED DESCRIPTION

Figure 1:
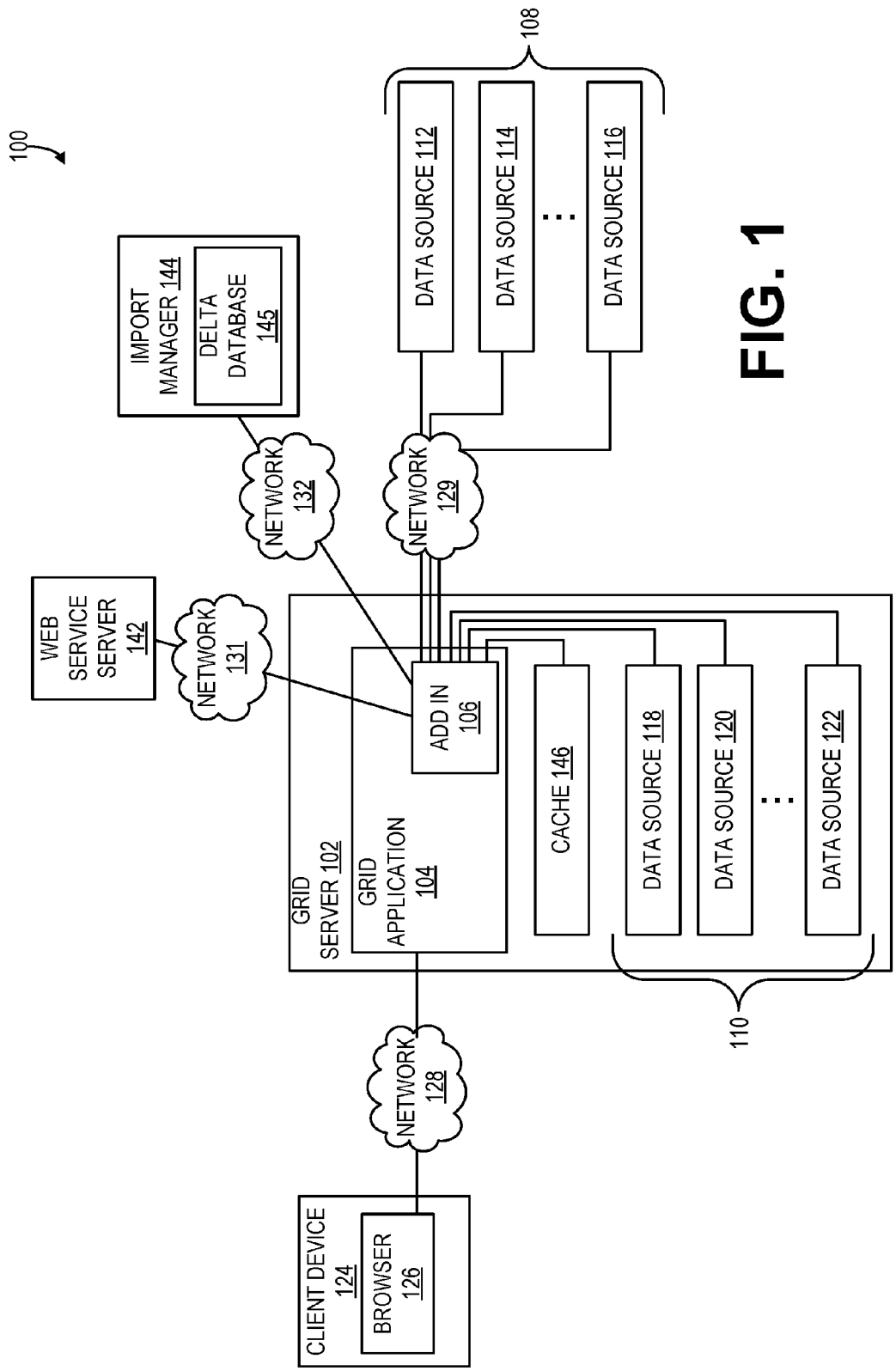
FIG. 1 shows a schematic illustration of an example computing environment.
Figure 2:
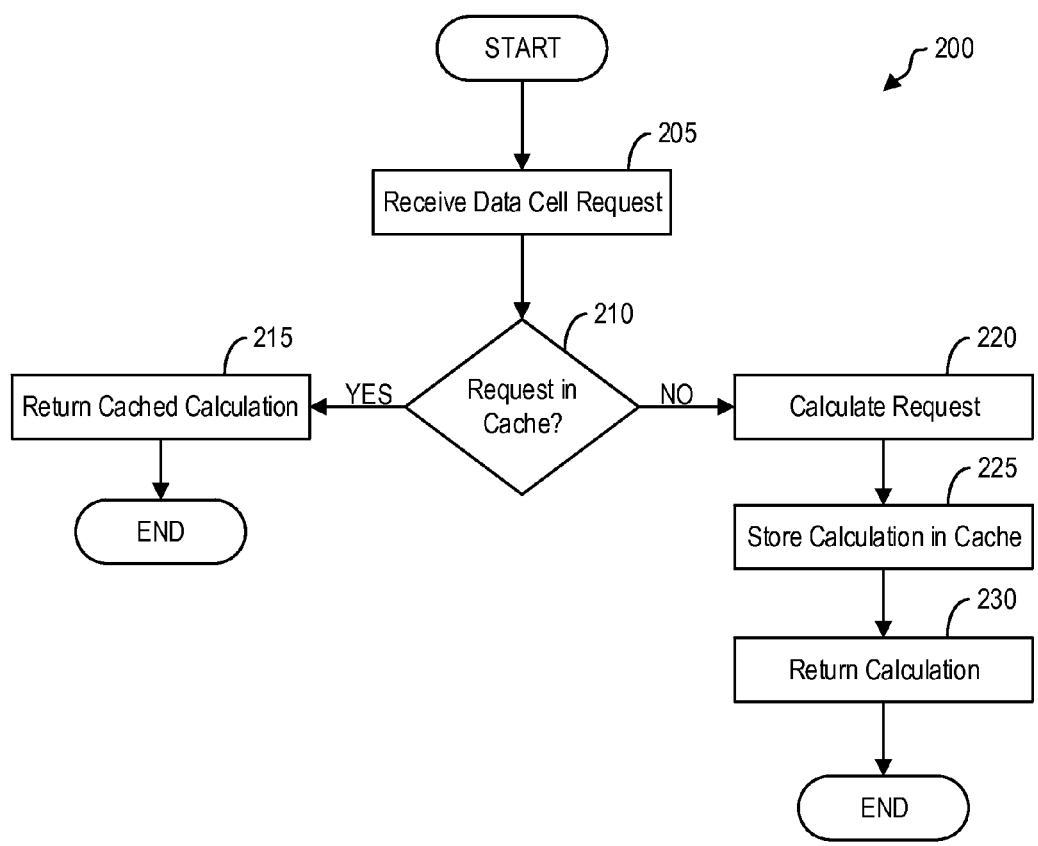
FIG. 2 shows a high-level flow chart illustrating a method for caching data.
Figure 7:
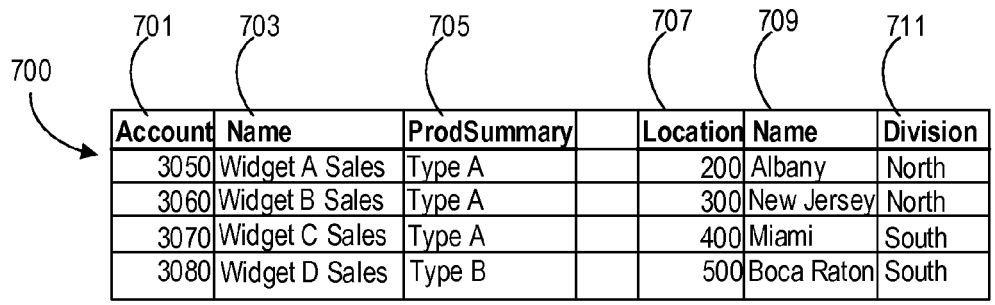
FIG. 7 shows an example grid illustrating account groupings.
Figure 8:
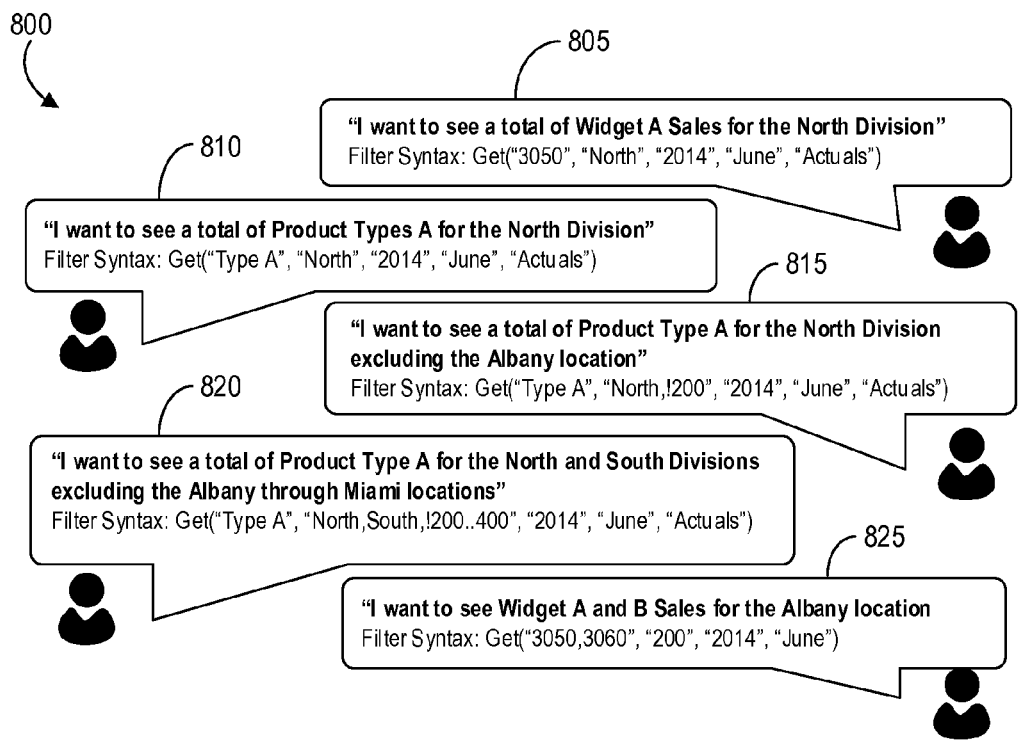
FIG. 8 illustrates example notation input for requesting data associated with account groupings.
Figure 9:
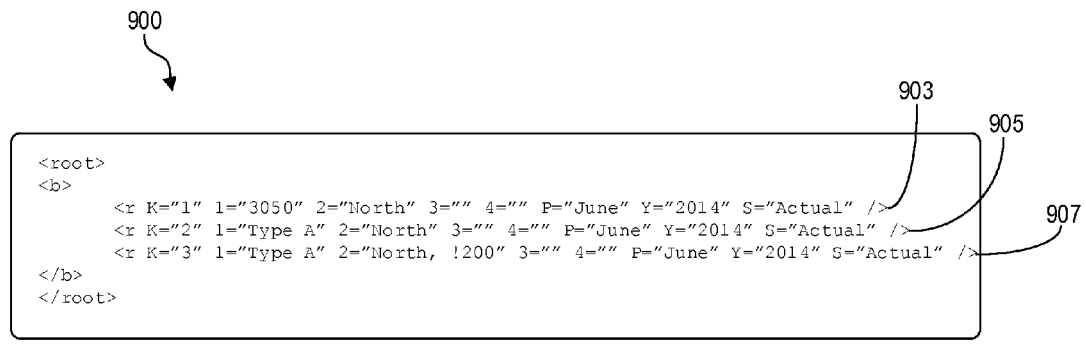
FIG. 9 shows an example data request associated with off-loading processing.
Figure 10:
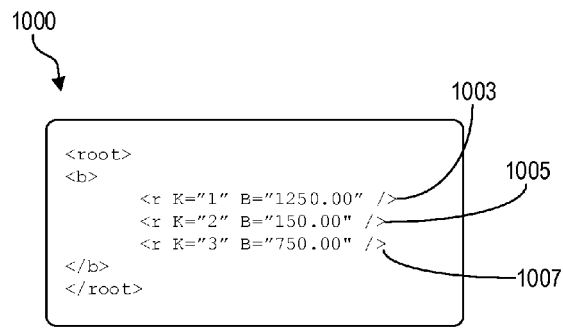
FIG. 10 shows an example server response associated with off-loading processing.
Figure 11:
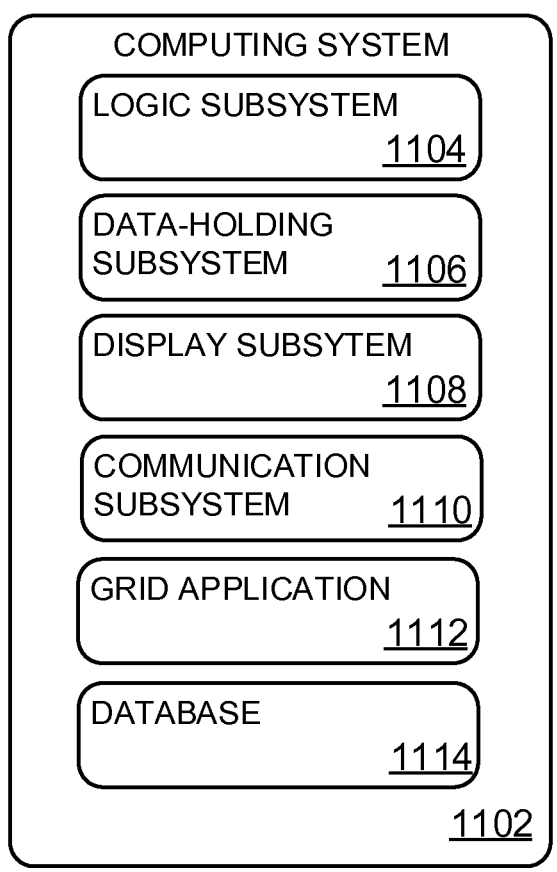
FIG. 11 schematically shows an example computing system.

As remarked above, grids or tables, for example, as provided by a spreadsheet application running on a computing device, may be used to organize, access, and format data, for example financial data, from various data sources for use in generating and interacting with various data reports. The present disclosure is directed to managing and interacting with data in a grid directly from data sources in a computing environment such as shown in FIG. 1. Data requests may be cached to eliminate redundant calculations, as shown in FIG. 2. An invalidation method such as the method shown in FIG. 3 may be implemented in order to keep the cache up to date with the latest data. A method for only importing changes to data is shown in FIG. 4. Such a method eliminates the need to update all data for the period imported in the grid server. Historical changes to the data may be stored by an import manager, as shown in FIG. 5, in order to provide transparent reporting to the user related to the history of changes, while the most recent data values may be stored on a grid server, as shown in FIG. 6. Data may be configured with numerous identification keys in order to facilitate efficient processing, as shown in FIG. 7. These identification keys enable an advanced grouping syntax, as shown in FIG. 8, which allows one or more requests to be packaged as shown in FIG. 9. A grid server processes the packaged requests and returns an appropriate response, as shown in FIG. 10. An example computing system is shown in FIG. 11.

Turning to the figures, FIG. 1 shows an example computing environment 100 for managing data in a grid. For example, computing environment 100 may be used to import data from various data sources in various locations, e.g., local data sources, networked data sources, or cloud-based data sources, into a grid for data management and display.

Computing environment 100 includes a grid server 102 configured to provide instances of grids or tables to a user for managing data. For example, grid server 102 may include a grid application 104, e.g., a spreadsheet application or the like, configured to provide a grid with rows and columns to user for data input, data importing, data manipulation, data sharing, data formatting, etc. Grid server 102 may be any suitable computing device configured to provide a grid to a user in any suitable way. For example, grid server 102 may be configured to provide a grid via network 128 to a client device 124. Network 128 may be any suitable network, for example, network 128 may be a local area network or the internet. Client device 124 may include a browser 126 or other suitable application configured to access grid server 102 and display a grid or table provided by a grid server 102 on a display of client device 124. For example, grid server 102 may be a company server into which users log-on via terminal computers in order to access grid application 104. As another example, grid server 102 may be configured as a web server into which users of personal computers may remotely access grid application 104 via the internet. For example, grid application 104 may be configured to operate in a cloud computing environment, that is, the application may be running over a plurality of servers and may be accessible by users of client devices over the internet. The client devices may be personal computing devices or mobile devices, for example, cell phones, tablets, laptops, and the like. For example, a user may desire to manage data in a grid or table via the cloud from a variety of different locales or networks.

As another example, a user of grid server 102 may locally access a grid provided by the grid server. For example, a user of grid server 102 may access a grid or table by running a grid application, for example, grid application 104, on grid server 102. Thus the grid application 104 may be locally installed on a client computer or may be utilized through a web browser.

In some examples, the grid server 102 and/or grid application 104 may include an add-in 106 or other suitable plug-in configured to confer additional functionality to grid server 102 and/or grid application 104. However, in some examples, additional functionality may be built directly into the functionality of the grid server or grid application. For example, add-in 106 may provide the grid server or grid application with specialized functions accessible by a user of a grid or table provided by grid server 102 to perform additional tasks within the grid. For example, the add-in 106 or additional functionality may provide various functions which can directly interface with various specified data sources to import, format, and update data in a grid provided by grid server 102. Further, the add-in 106 or the additional functionality may provide various authentication options for accessing different data sources with different security requirements and stored procedures and may provide various filtering and display options for control of data presented in a grid. Examples of authentication and filtering options are described in more detail herein below.

Data sources accessible by the grid server may be any suitable sources of data, for example, databases, web data servers, and proprietary databases associated with programs such as Enterprise Resource Planning (ERP) Systems, Business Intelligence Solutions, Data Warehouses, and transactional data systems. In some examples, such data sources may be external to grid server 102 and/or client device 124. For example, a plurality of external data sources 108 including data source 112, 114, and 116 may be accessible to grid server 102 via add-in 106 or via additional functionality in grid server 102. In some examples, data sources may also be internal to grid server 102 and/or client device 124, for example, residing in a memory component of grid server 102 or client device 124. By way of example, a plurality of internal data sources 110 including data sources 118, 120, and 122 may be accessible to grid application 104 via add-in 106.

Any suitable data source may be accessed by grid server 102 once a path to the data source is specified. A path to a data source may be a network path, for example, for a cloud-based data source, or a local path to a data source stored on grid server 102 or client device 124. For example, a path to a cloud-based data source may include a URL. For example, an administrator may register a data source by providing a path or address to the data source and security settings and various other protocols associated with the data source. In this way, data may be directly imported into a grid from a variety of different data sources or data servers with different data storage formats and protocols.

Further, in some examples, a grid server 102 may have security settings associated with it so the grid application 104 may provide authentication credentials on each request. The grid server 102 may can be configured to limit the view based on data components stored in the grid server 102 or through data stored outside in other data sources, for example, data sources 108. The configuration for security may also utilize groupings on account segment data to determine what data can be viewed by the specific user based on certain groups of data, such as locations, accounts or cost centers.

Further, in some examples, grid server 102 may be configured to communicate with various other web services to perform various actions associated with an instance of a grid provided by grid server 102 to a user. For example, a web service server 142 may be accessed by grid server 102 via a network 131 which may be a local network or the internet. For example, web service server 142 may perform various functions on behalf of grid server 102 in response to user inputs associated with a grid provided by grid server 102. For example, web service server 142 may handle a portion of authenticating a user for a particular data source access or may handle a particular HTTPS protocol. As another example, web service server 142 may handle sharing or publishing of a data report generated by an instance of a grid.

The functionality of add-in 106 may enable specialized notation input for managing data from data sources registered with the grid application 104 or on grid server 102 and may be used in addition to other tools and forms available in the grid application 104 or provided by the grid server 102. For example, add-in 106 may enable specific functions to be added to a grid. Add-in 106 may also refer to functionality that is built within an instance of a grid itself rather than provided by a separate add-in. These specific functions may utilize various parameters to manage data from specified data sources and to handle different data sources and associated authentication procedures and data storage formats. For example, such specialized functions may be used to import, update, format, and/or drill down data from various data sources as well as handle authentication procedures so that a user can access data in a specified data source.

Grid server 102 may be scheduled to synchronize with external data sources 108 by using import manager 144. That is, import manager 144 may be configured to import data to grid server 102 from external data sources 108. In one example, import manager 144 may be configured to only import changes in data stored in external data sources 108. In this way, the most recent data may be displayed in a grid on data server 102 without the need to refresh all data displayed in a grid on data server 102. A method for only importing changed data is discussed further herein and with regard to FIG. 4. Import manager 144 may be further configured with a change database, or delta database, 145 to store historical information about data values. An example of a delta database 145 is discussed further herein and with regard to FIGS. 5 and 6. In one example, import manager 144 may be accessed by grid server 102 via a network 132 which may be a local network or the internet. In another example, import manager 144 and grid server 102 may be combined on the same computing device. Furthermore, the changes may be updated by a defined process so all the changes are flattened into one change, which may be used to preserve data storage space for periods that are further back in history.

In some examples, computing environment 100 may include one or more clones (not shown) of grid server 102 that may be used to improve redundancy. For example, if one grid server 102 goes down, other grid servers may be leveraged to absorb the processing with little effect on the end user. Further, as resources for existing grid servers 102 reach their maximum, the creation of more grid server clones can be used to serve more end users.

Grid server 102 may further include a cache 146 for storing data request results. For example, grid server 102 may process a data request and store the result in cache 146, so that if grid server 102 receives the same data request again, the cached result in cache 146 may be returned without any further processing. A method for caching data is described further herein and with regard to FIG. 2.

FIG. 2 shows an example method 200 for caching data in cache 146. When a centralized server such as grid server 102 is requested to perform calculations for numerous cell requests, the system uses a caching algorithm to leverage previously calculated requests. By doing so the resources are spared in recalculating results on amounts that have not changed and the results can be provided to the end user more quickly. Furthermore, the caching algorithm and calculation method allow for a relational database to be efficiently used in dimensional analytical reporting such as normally performed by online analytical processing (OLAP) database servers. Method 200 may be stored as executable instructions in non-transitory memory in grid server 102.

Method 200 may begin at 205. At 205, method 200 may include receiving a data cell request. Grid server 102 may receive a data cell request from client device 124 via grid application 104. In examples where grid application 104 is installed on client device 124 instead of grid server 102, receiving a data cell request may comprise receiving a data request package and unpacking the data request package. In this way, processing of the data cell requests is off-loaded from client device 124 and performed instead by grid server 102, thereby minimally encumbering the user session. Off-loading the processing of data cell requests using data request packages is described further herein and with regard to FIGS. 9 and 10. Method 200 may then proceed to 210.

At 210, method 200 may include determining if the request is stored in the cache 146. Determining if the request is stored in the cache 146 comprises checking if the specific request filters are found in the cache data where the request was previously calculated. If the request is stored in the cache 146, method 200 proceeds to 215 where the cached calculation is returned to grid application 104. Grid application 104 receives the result and transfers the results to the cell or cells in the spreadsheet or grid displayed on client device 124 where the notation was entered. Method 200 may then end. If the request is not stored in the cache 146, method 200 proceeds to 220 where the request is calculated from the latest data storage that includes the most recent amounts. Method 200 may then proceed to 225.

At 225, the calculation is added to the cache 146. In this way, if the same requests are requested again, the cache 146 may be used to return the correct values without any calculation processing. Method 200 may then proceed to 230, where the calculated value is returned to client device 124 via grid application 104. That is, grid application 104 receives the result and transfers the results to the output expected in the spreadsheet or grid based on the location of the notation entered. Method 200 may then end.

Figure 3:
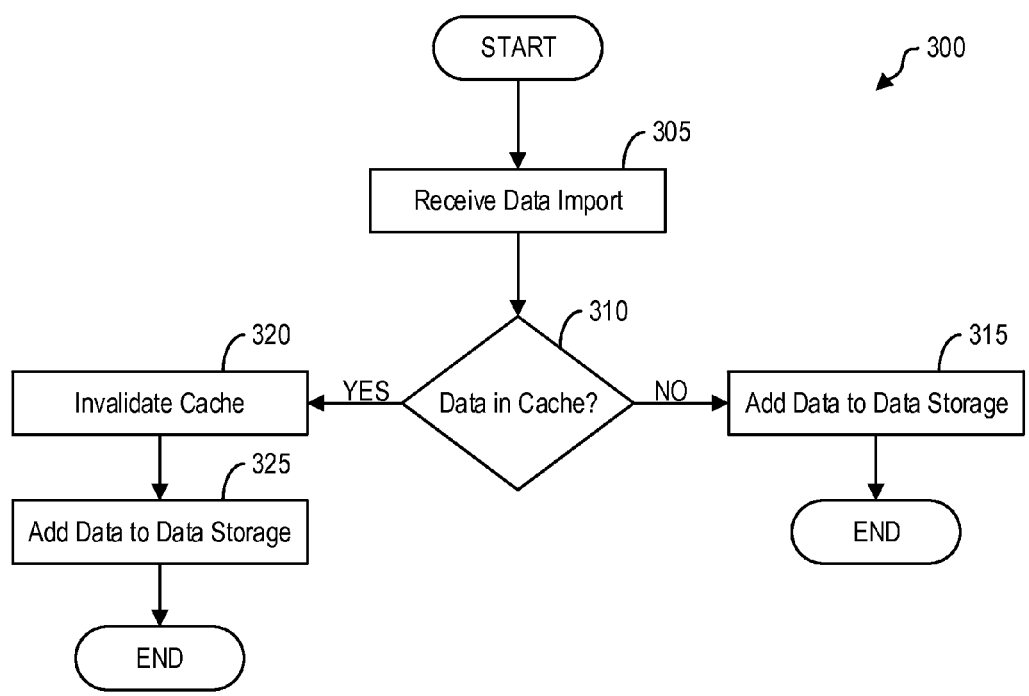
FIG. 3 shows an example method for importing data.
Figure 4:
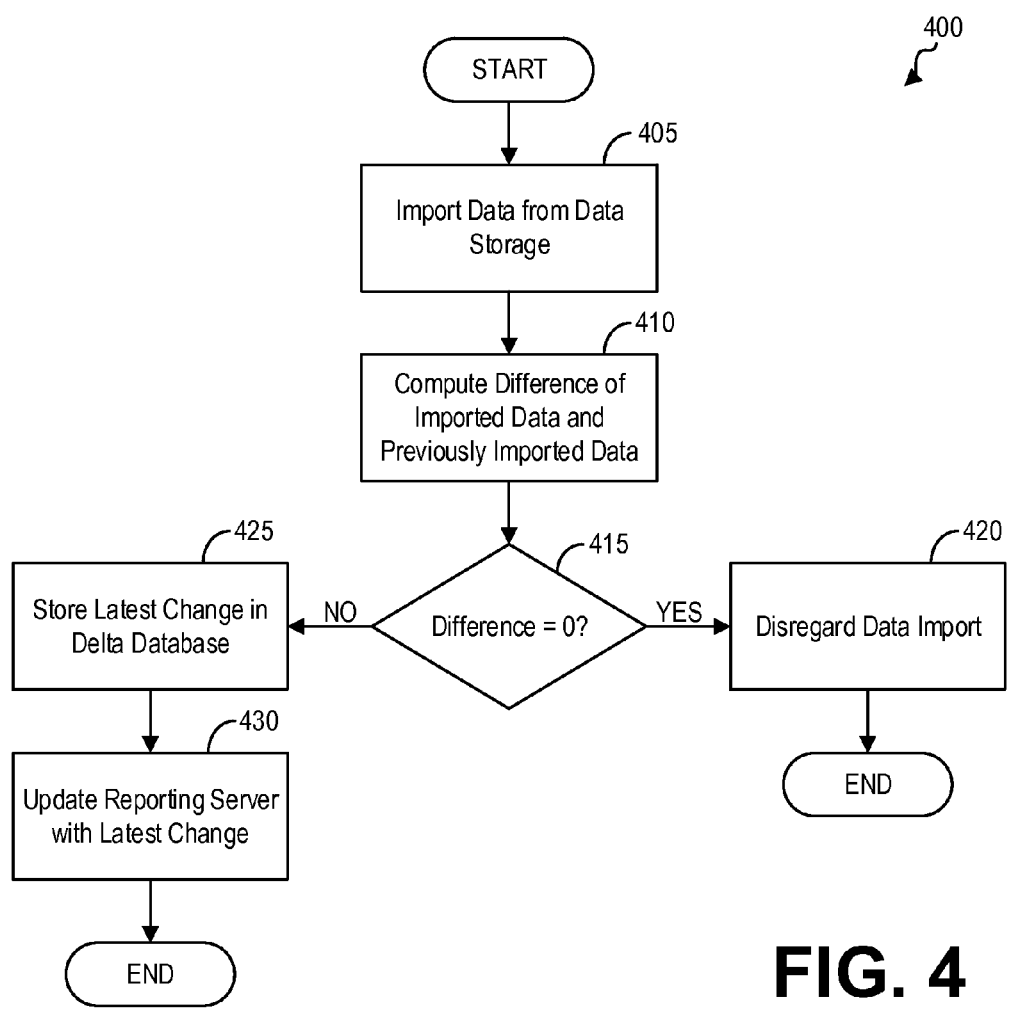
FIG. 4 shows an example method for only importing data changes.

FIG. 3 shows an example method 300 for updating the cache 146 when importing data from external data sources 108 into grid server 102. Method 300 invalidates, that is, removes from the valid cache, previously calculated requests that are no longer valid since newly imported changes have affected the results. At this time the system can either recalculate the results and keep the cached item valid or mark it to be recalculated at the next event when the same request filters and grouping syntax are used.

Method 300 may begin at 305. At 305, method 300 may include receiving a data import. Such new data imports may provide updated numbers that were previously calculated and added to the cache. Method 300 may then proceed to 310.

At 310, method 300 may include determining if the imported data is stored in the cache 146. If the imported data is not stored in the cache 146, method 300 proceeds to 315, where the imported data is added to database 110 in grid server 102. Method 300 may then end. If the imported data is stored in the cache 146, method 300 proceeds to 320.

At 320, method 300 may include invalidating the cache 146. Invalidating the cache 146 may include invalidating any data, including calculation results, corresponding to the imported data. In one example, method 300 may further include recalculating the cached requests that are no longer valid. In another example, the cached requests that are no longer valid may be recalculated at a later scheduled time. Method 300 may then continue to 325.

At 325, method 300 may include adding the imported data to grid server 102. If grid server 102 comprises one or more clones, the imported data may be synchronized with each clone. Method 300 may then end.

FIG. 4 shows an example method 400 for only importing data changes to the grid server 102 in accordance with the current disclosure. Method 400 comprises capturing only new changes to imported data instead of replacing the full data being imported. This method reduces overhead, provides an ability to synchronize efficiently to dependent grid servers, and provides a history of changes that the end users will appreciate to report on when changes were not expected in their grid application reports. For example, imported data that is the same as data previously imported is not updated in the database 110 that is the data source for reports. Thus updating of the database 110 and synchronizing to clones of grid server 102 can be performed more quickly compared to updating all of the data stored on grid server 102.

Method 400 may begin at 405. At 405, method 400 may include importing data from data storage such as external data sources 108. In one example, external data sources 108 may be accessed via a network 129 which may be a local network or the internet. In one example, third-party software may push the data into the import process. In another example, import manager 144 may be configured to pull the data into the import process. Import manager 144 may be further configured to pull the data into the import process on a regular schedule, for example, every fifteen minutes. In another example, import manager 144 may be configured to monitor the external data sources 108 for activity and pull the data responsive to an update of the data sources. In yet another example, import manager 144 may include a user interface that enables a user to manually pull the data into the import process. Method 400 may then continue to 410.

At 410, method 400 may include computing the difference of current data and previous data to generate a change, or delta, value. Continuing to 415, method 400 may include determining if the delta value, or the difference between current data and previous data, is non-zero. If the delta value is zero, then no change in the data has occurred and method 400 may continue to 420. At 420, method 400 may include disregarding the data import, and method 400 may then end. If the delta value is non-zero, then method 400 may proceed to 425.

At 425, method 400 may include storing the latest change in the delta database 145 of import manager 144. The delta database 145 of import manager 144 contains historical information about data changes, thereby providing change visibility options for client reporting. Storing the latest change in the delta database 145 is described further herein and with regard to FIG. 5. Method 400 may then continue to 430.

At 430, method 400 may include updating the grid server 102 with the latest change of data. Updating the grid server 102 with the latest change of data comprises synchronizing the one or more grid server databases 110 with the most current data stored in external data storage 108. Updating the grid server 102 with the latest change of data is described further herein and with regard to FIG. 6. Method 400 may then end.

FIG. 5 is an example grid 500 illustrating how imported changes are recorded by a delta database 145 in import manager 144. Delta database 145 comprises grid 500, which contains historical data values.

Grid 500 includes a reference key "Ref Key" 503 that represents a combination key based on the general ledger account segments or other key data. Columns "Source" 505, "Year" 507, "Period" 509, and other key data "Ect" 510 may be used as additional keys. Column "Change" 511 will increment on each set of changes for select keys. Column "Value" 513 represents the value associated with the set of keys 503, 505, 507, 509, 510 and corresponding to a change value 511. Column "Delta" 515 includes the difference between a given value and the previous value.

In the example shown in FIG. 5, two values for actuals in June 2014 for reference key 154863 are shown. Change 1 represents an original value of 150.00, thus the delta is 150.00; that is, the difference between the value of change 1 (150.00) and the previous non-existent value (0.00) is 150.00. Change 2 represents an updated value of 250.00, thus the delta value is 100.00; that is, the difference between the value of change 2 (250.00) and the value of change 1 (150.00) is 100.00. In this way, delta database 500 may include all historical values of data, thereby enabling a user to easily view how data has changed over time.

FIG. 6 is an example grid 600 illustrating how the latest data values are stored in grid server 102. The latest change sequence is replaced in the table that stores the latest data values. In this way, grid server 102 may be kept up to date with the latest values without the need to update each data value regardless of whether or not the data value has changed.

Grid 600 includes the key columns in grid 500, that is, columns "Source" 605, "Year" 607, "Period" 609, and other key data "Ect" 610. However, grid 600 only stores the latest value for Change 511 as "LastChange" 605 and the corresponding value 513 as "Value" 607.

The example shown in FIG. 6 corresponds to the delta database 500 shown in FIG. 5. Therefore, the LastChange value is 2 and the latest Value is 250.00. The change values may be used to efficiently synchronize the changes to one or more grid servers 102 that do not have a record of the more recent change values.

FIG. 7 shows an example grid 700 illustrating account groupings according to an embodiment of the current disclosure. Advanced grouping syntax provided to the end user may represent multiple items to report. This syntax not only provides the efficient inclusion of many items, but also the exclusion as well. The exclusion syntax reduces the need for as many groupings and allows more flexibility for the end users to request precisely what they want in each cell request.

Grid 700 includes an example grouping definition for an "account" segment ProdSummary 705. In this example grouping definition, each Account 701 is associated with a Name 703 and a ProdSummary 705. Grid 700 also includes an example grouping definition for a "location" segment example for a group Division 711. In this example grouping definition, each Location 707 is associated with a Name 709 and a Division 711. Implementation of such grouping definitions is described further herein and with regard to FIG. 8.

FIG. 8 illustrates example notation input 800 for requesting data associated with account groupings according to an embodiment of the current disclosure. In particular, example notation input 800 includes examples of the syntax a user may use to retrieve the stated needs. The Get( ) function text provided in the examples represent notation that may be used to specify the parameters or filters that the user wishes to request from the data source. Each of the five examples help illustrate the usage of the syntax, specifically the syntax relating to excluding select items or groupings. The five examples illustrate how the example grouping definitions described hereinabove with regard to FIG. 7 may be used to form requests.

Example 805 illustrates how a user may use the grouping notation to perform a specific request. For example, if the user would like to see a total of Widget A Sales for the North Division, the appropriate filter syntax entered by the user may include Get("3050", "North", "2014", "June", "Actuals"). Examples 810, 815, 820, and 825 similarly illustrate how a user may use the grouping notation to perform a specific request. Each combination of grouping keys may correspond to a specific calculation of a specific set of data.

In examples where grid application 104 is installed on client device 124, grid application 104 may package the data cell request into an appropriate format to send to a remote server, for example grid server 102, where the data is stored and where the calculation may be performed. Such off-load processing is described further herein and with regard to FIGS. 9 and 10.

FIG. 9 shows an example data request package 900 for off-loading processing according to an embodiment of the current disclosure. Data request package 900 is packaged on client device 124 and sent to a grid server 102 via either a direct connection to a database or through a web service. In this example, three requests are packaged using XML, however other structures such as JSON may be used. In particular, request 903 corresponds to data request 805, request 905 corresponds to request 810, and request 907 corresponds to request 815. For example, request 805 shows that the end user may want the total of Widget A Sales for the North Division, and so the end user may enter the syntax Get("3050", "North", "2014", "June", "Actuals") in grid application 104. Grid application 104 then converts this request into the XML format shown by 903, and data request package 900 is sent to grid server 102. Each request may include an automatically generated Request Key (noted as "K" in the XML). Furthermore, the data may be encrypted. The package 900 can be sent to grid server 102 in an asynchronous request so the user session may continue with minimal obstruction.

FIG. 10 shows an example server response 1000 associated with off-loading processing according to an embodiment of the current disclosure. The calculations are completed and the results are repackaged and sent back to the end user session. FIG. 10 shows how the return package may be structured for returning the value for each Request Key (noted as "K" in the XML). Server response 1000 is sent to client device 124 in response to receiving data request package 900, so that response 1003 corresponds to request 903, response 1005 corresponds to request 905, and response 1007 corresponds to request 907. Thus, in response to request 903, which represents the user request Get ("3050", "North", "2014", "June", "Actuals"), grid server 102 calculates the total of Widget A sales for the North Division using the corresponding data stored on reporting server 211 and returns the value "1250.00" to client device 124.

As described hereinabove with regard to FIG. 2, grid server 102 may first determine if the request is stored in the cache 146 prior to processing the request. If the calculation corresponding to the request has already been performed and stored in the cache 146, then grid server 102 returns the cached calculation without further processing. If the calculation corresponding to the request has not been performed and stored in the cache 146, grid server 102 calculates the request, stores the calculation result in the cache 146, and returns the calculation result to client device 124, where the result is displayed in grid application 104. Grid server 102 applies the method shown in FIG. 3 to each request in package 900.

FIG. 11 schematically shows a non-limiting computing system 1102 that may perform one or more of the above described methods and processes. It is to be understood that virtually any computer architecture may be used for a computing device without departing from the scope of this disclosure. In different embodiments, computing system 1102 may take the form of a mainframe computer, server computer, desktop computer, laptop computer, tablet computer, home entertainment computer, network computing device, mobile computing device, mobile communication device, gaming device, etc.

Computing system 1102 includes a logic subsystem 1104 and a data-holding subsystem 1106. Computing system 1102 may optionally include a display subsystem 1108, communication subsystem 1110, and/or other components not shown in FIG. 11. For example, computing system 1102 may also optionally include user input devices such as keyboards, mice, game controllers, camera, microphones, and/or touch screens.

Logic subsystem 1104 may include one or more physical devices configured to execute one or more instructions. For example, logic subsystem 1104 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 1104 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1106 may include one or more physical, non-transitory devices configured to hold data and/or instructions executable by the logic subsystem to implement the herein described methods and processes. When such methods and processes are implemented, the state of data-holding subsystem may be transformed (for example, to hold different data).

Data-holding subsystem 1106 may include removable media and/or built-in devices. Data-holding subsystem 1106 may include optical memory (for example, CD, DVD, HD-DVD, Blu-Ray Disc, etc.), semiconductor memory devices (for example, RAM, EPROM, EEPROM, etc.), and/or magnetic memory devices (for example, hard disk drive, floppy disk drive, tape drive, MRAM, etc.), and the like. Data-holding subsystem 1106 may include devices with one or more of the following characteristics: volatile, non-volatile, dynamic, static, read/write, read-only, random access, sequential access, location addressable, file addressable, and content addressable. In some embodiments, logic subsystem 1104 and data-holding subsystem 1106 may be integrated into one or more common devices, such as an application specific integrated circuit or a system on a chip.

It is to be appreciated that data-holding subsystem 1106 includes one or more physical, non-transitory devices. In contrast, in some embodiments aspects of the instructions described herein may be propagated in a transitory fashion by a pure signal (for example, an electromagnetic signal, an optical signal, etc.) that is not held by a physical device for at least a finite duration. Furthermore, data and/or other forms of information pertaining to the present disclosure may be propagated by a pure signal.

When included, display subsystem 1108 may be used to present a visual representation of data held by data-holding subsystem 1106. As the herein described methods and processes change the data held by data-holding subsystem 1106, and thus transform the state of the data-holding subsystem 1106, the state of display subsystem 1108 may likewise be transformed to visually represent changes in the underlying data. Display subsystem 1108 may include one or more display devices utilizing virtually any type of technology. Such display devices may be combined with logic subsystem 1104 and/or data-holding subsystem 1106 in a shared enclosure, or such display devices may be peripheral display devices.

When included, communication subsystem 1110 may be configured to communicatively couple computing system 1102 with one or more other computing devices. Communication subsystem 1110 may include wired and/or wireless communication devices compatible with one or more different communication protocols. As non-limiting examples, communication subsystem 1110 may be configured for communication via a wireless telephone network, a wireless local area network, a wired local area network, a wireless wide area network, a wired wide area network, etc. In some embodiments, communication subsystem 1110 may allow computing system to send and/or receive messages to and/or from other devices via a network such as the internet.

In some examples, computing system 1102 may include a grid application 1112 which may be operatively connected to logic subsystem 1104 and data-holding subsystem 1106. Grid application 1112 may further include an add-in configured to confer additional functionality to grid application 1112 as described above. Computing system 1102 may also include at least one database 1114 or other suitable data source which may be accessed by the grid application 1112 to manage data contained in the database.

As one embodiment, a method for managing data in a grid displayed on a client device comprises, responsive to receiving a data request from the client device, returning to a cell or cells in the grid a cached calculation result corresponding to the data request if the data request is stored in a cache, and otherwise processing a calculation corresponding to the data request. The method further comprises storing the calculation result in the cache, and returning the calculation result to the cell or cells in the grid.

In one example, returning the calculation result comprises sending the calculation result to the client device over a network. In another example, receiving the data request and returning the cached calculation result or the calculation result is asynchronously performed.

In another example, the data request is based on a grouping syntax that can include and exclude specific items that relate to the data request or can include and exclude specific groups that represent the specific items. For example, the grouping syntax comprises a set of keys specifying a data source. As an example, the data source may comprise one or more locally-stored data sources. For example, the data source may comprise one or more data sources stored in a central server. As another example, the data source may comprise one or more remotely-stored data sources. As yet another example, the data source may comprise one or more locally-stored data sources and one or more remotely-stored data sources. A data source may refer to, as non-limiting examples, a computing device containing one or more databases, one or more databases, one or more tables of a single database, and so on.

In another example, the data request is received from the client device and the cached calculation result is returned to the client device over a network. The method further comprises authenticating a user of the client device to submit data requests and to limit data provided based on stored credentials.

As another embodiment, a method for managing data in a grid on a client device comprises, responsive to receiving an imported data value from a remote data source, replacing a previously imported data value with the imported data value responsive to a non-zero difference between the imported data value and the previously imported data value. The method further comprises storing the imported data value in a database responsive to the non-zero difference, and associating the imported data value with an incremental integer change value.

The method further comprises invalidating a calculation result dependent on the imported data value in a cache responsive to the non-zero difference, and recalculating the calculation result dependent on the imported data value responsive to the invalidation. In one example, recalculating the calculation result dependent on the imported data value occurs after a pre-determined time duration.

In another example, the imported data value is received responsive to an import request. For example, the import request is automatically performed after a time interval. In another example, the import request is automatically performed responsive to an update of the remote data source.

As yet another embodiment, a system for managing data in a grid comprises one or more non-transitory data sources configured to store raw data and a grid server configured with a relational database and adapted to service data cell requests from a client device. The grid server is configured to store data processed from the raw data in the relational database, and is further configured with a cache to store calculations. The system further comprises an import manager configured to import changes in the raw data from the data storage into the grid server and to store historical values of the raw data.

In one example, the grid server is a remote computing device. In another example, the client device is communicatively coupled to the grid server, and the client device includes a grid application configured to display the data processed from the raw data on the client device. In yet another example, grid server comprises one or more clones of the grid server.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. A method for managing data in a grid displayed on a client device, comprising:
   receiving a data request from the client device, wherein the data request is received by a grid application and transmitted to a grid server configured with a database and adapted to service requests from the client device;
   storing cached calculations on a central server, wherein the central server is part of a computing system including one or more processors configured to execute software instructions;
   retrieving a cached calculation result from the central server responsive to the grid server receiving the data request from the client device;
   returning to a cell or cells in the grid the cached calculation result corresponding to the data request if the data request is stored in a cache on the central server; and
   otherwise processing a calculation corresponding to the data request, wherein otherwise processing a calculation corresponding to the data request comprises:
      conversion of the data request to a format interpretable by the grid server;
      accessing data in the database on the grid server; and
      using the database to perform dimensional analytical reporting;
   wherein a response to the data request is returned to the client device via the grid application;
   wherein receiving the data request from the client device and returning the cached calculation result or the calculation result to the client device is asynchronously performed.

2. The method of claim 1, wherein returning the calculation result comprises sending the calculation result to the client device over a network.

3. The method of claim 1, wherein the data request is packaged based on a grouping syntax that can include and exclude specific items that relate to the data request or can include and exclude specific groups that represent the specific items.

4. The method of claim 3, wherein the grouping syntax comprises a set of keys specifying a data source.

5. The method of claim 4, wherein the data source comprises one or more data sources stored in the central server.

6. The method of claim 1, wherein the data request is packaged on the client device and received therefrom over a network and the cached calculation result is similarly packaged and returned to the client device over the network.

7. The method of claim 1, further comprising authenticating a user of the client device to submit data requests and to limit data provided based on stored credentials.

8. A method for managing data in a grid on a client device, comprising:
   importing a data value from a remote data source into a grid server, wherein the grid server is part of a computing system including one or more processors configured to execute software instructions;
   responsive to receiving an imported data value from a remote data source on a central server, comparing the imported data value to cache calculations stored on the grid server, wherein the central server is part of the computing system including one or more processors configured to execute software instructions;
   invalidating a calculation result dependent on the imported data value in a cache on the central server, wherein the cache is responsive to a non-zero difference;
   recalculating the calculation result dependent on the imported data value responsive to invalidation by a grid server, wherein recalculating the calculation result comprises accessing data in a database on the grid server and using the database to perform dimensional analytical reporting;
   replacing a previously imported data value with the imported data value responsive to a difference between the imported data value and the previously imported data value; and
   sending the recalculated result to a client device;
   wherein importing the data from the remote data source and sending the recalculated result to the client device is asynchronously performed.

9. The method of claim 8, further comprising storing the imported data value in the database on the grid server responsive to the difference.

10. The method of claim 9, further comprising associating the imported data value with an integer incremental change value.

11. The method of claim 8, further comprising invalidating the calculation result dependent on the imported data value in the cache responsive to the difference.

12. The method of claim 11, further comprising recalculating the calculation result dependent on the imported data value responsive to the invalidation.

13. The method of claim 12, wherein recalculating the calculation result dependent on the imported data value occurs after a pre-determined time duration.

14. The method of claim 8, wherein the imported data value is received responsive to an import request.

15. The method of claim 14, wherein the import request is automatically performed responsive to an update of the remote data source.

16. A system, comprising:
   one or more physical non-transitory data sources configured to store data, wherein the physical non-transitory data sources are connected via a network to a client device;
   a grid server configured with a database and adapted to receive data requests from the client device and execute the data requests, the client device comprising a remote computing device connected to the grid server via the network;
   wherein the grid server is configured to store data processed from the data in the database, the grid server further configured with a cache to store calculations, wherein the grid server is part of a computing system including one or more processors configured to execute software instructions;
   an import manager configured to import changes in the data from the data storage into the grid server and to store historical values of the data; and
   a reporting server configured to receive updated changes from the import manager, wherein the reporting server returns the updated changes to the grid server;
   wherein the updated grid server is adapted to return results based on the data request to the client device; and
   wherein executing the data request from the client device and returning results to the client device is asynchronously performed.

17. The system of claim 16, wherein the client device is communicatively coupled to the grid server, and wherein the client device includes a grid application configured to display the data processed from the data on the client device.

18. The system of claim 16, further comprising one or more clones of the grid server.

* * * * *